Reissued Jan. 9, 1923. Re. 15,522

UNITED STATES PATENT OFFICE.

AIMÉE MOUILLAUD SAINT, OF KAPLAN, LOUISIANA.

PROCESS OF PREPARING WHOLE RICE.

No Drawing. Original No. 1,387,560, dated August 16, 1921, Serial No. 472,869, filed May 26, 1921. Application for reissue filed December 1, 1922. Serial No. 604,429.

*To all whom it may concern:*

Be it known that I, AIMÉE MOUILLAUD SAINT, a citizen of the United States, residing at Kaplan, in the parish of Vermilion and State of Louisiana, have invented a new and useful Improvement in Processes of Preparing Whole Rice, of which the following is a specification.

This invention relates to a process of treating rice to produce a granular, partly pre-cooked cereal for use as a breakfast food and for like purposes, one of its objects being to eliminate the necessity of boiling the rice prior to subjecting it to the other steps of the process, and to retain all of the ingredients of the food, some of which are lost or changed in the boiling process.

With the foregoing and other objects in view the invention consists of certain novel steps in the method which will be hereinafter more fully described and claimed, it being understood that various changes may be made within the scope of the claim without departing from the spirit of the invention.

In carrying out the process unpolished rice is used with the outer hull removed. This unpolished rice is thoroughly washed after which it is placed, while wet, in an aluminum pan resting on coils through which steam is passed for the purpose of thoroughly heating the pan. The rice is thus baked and dried but not roasted. By baking the rice the same becomes thoroughly sterilized and thus rendered especially desirable as a food for children and invalids. It is also rendered weevil proof and is increased in bulk. After being baked the rice is cooled and then reduced to a granular condition, the particles being about the size of those of granulated sugar. The material is again thoroughly cooled after the grinding process and afterwards packed ready for use.

Rice prepared by the process herein described is palatable and easily digested. It can be quickly prepared for use as a breakfast food or porridge, as a pudding, etc., with very little additional cooking because it is partially cooked by the process. It can also be served in cooked form with meats and vegetables.

What is claimed is:

The herein described process of preparing a cereal food which consists in washing whole unpolished rice, placing the same, while wet, in a pan where it is heated, thereby to bake and dry the rice, then cooling the rice, and finally reducing the rice to a granular form.

In testimony that I claim the foregoing as my own, I have hereto affixed my signature in the presence of two witnesses.

AIMÉE MOUILLAUD SAINT.

Witnesses:
J. S. GARY,
L. T. BAUR.